(12) United States Patent
Spencer et al.

(10) Patent No.: US 6,364,596 B1
(45) Date of Patent: Apr. 2, 2002

(54) HAY BALE CART

(75) Inventors: Mark D. Spencer; Jeanne M. Spencer, both of Victor, MT (US)

(73) Assignee: Jeanne E. McKinney, Hamilton, MT (US)

( * ) Notice: Subject to any disclaimer, the term of this patent is extended or adjusted under 35 U.S.C. 154(b) by 0 days.

(21) Appl. No.: 09/484,212

(22) Filed: Jan. 18, 2000

Related U.S. Application Data

(60) Provisional application No. 60/116,337, filed on Jan. 19, 1999.

(51) Int. Cl.⁷ .................................................. B62B 3/04
(52) U.S. Cl. ...................... 414/444; 414/450; 414/457; 280/47.18; 280/47.23
(58) Field of Search .................. 414/444, 450, 414/457; 280/47.16, 47.18, 47.2, 47.23

(56) References Cited

U.S. PATENT DOCUMENTS

| | | | |
|---|---|---|---|
| 326,812 A | * 9/1885 | Walker et al. | ............... 414/457 |
| 1,122,805 A | 12/1914 | Schertz | |
| D145,505 S | 9/1946 | Beidelman, Jr. | |
| 2,797,125 A | * 6/1957 | Vogler | ................ 280/47.18 X |
| 3,350,797 A | * 11/1967 | Dassinger et al. | ... 280/47.18 X |
| 3,913,762 A | * 10/1975 | Alexander | .............. 414/444 X |
| 4,095,706 A | 6/1978 | Schwien et al. | |
| 4,174,849 A | * 11/1979 | Wetzel | .................... 414/457 X |
| 4,549,743 A | 10/1985 | Shimon | |
| 4,573,846 A | 3/1986 | Willbanks et al. | |
| 4,773,806 A | 9/1988 | Beaulieu | |
| 4,793,623 A | * 12/1988 | Talbot | .................... 414/450 X |
| 5,090,368 A | 2/1992 | Berghoefer | |
| 5,474,312 A | 12/1995 | Starita et al. | |
| 5,639,198 A | 6/1997 | Pearce | |
| 5,769,587 A | 6/1998 | Gilfoil et al. | |

FOREIGN PATENT DOCUMENTS

| | | | | |
|---|---|---|---|---|
| FR | 1325377 | * | 3/1963 | ............... 280/47.18 |
| GB | 2033848 | * | 5/1980 | ............... 280/47.18 |
| GB | 2246545 | * | 2/1992 | ............... 280/47.18 |

* cited by examiner

*Primary Examiner*—Steven A. Bratlie
(74) *Attorney, Agent, or Firm*—Saliwanchik, Lloyd && Saliwanchik, P.C.

(57) ABSTRACT

A hand cart adapted to lift and transport a single bale of hay or straw is disclosed. The cart is fabricated from metal stock pieces which are welded to form a rigid frame. The frame is designed with spaced apart wheels which will allow the cart to straddle the bale. Plural prong members impale and secure the bale for lifting and transporting.

11 Claims, 5 Drawing Sheets

HAY BALE CART

CROSS-REFERENCE TO RELATED APPLICATION

This application claims the benefit of U.S. Provisional Patent Application Ser. No. 60/116,337, filed Jan. 19, 1999.

BACKGROUND OF THE INVENTION

1. Field of the Invention

The present invention relates generally to land vehicles. More specifically, the present invention is drawn to a two-wheeled hand cart for transporting bales of hay.

2. Description of Related Art,i

On ranches and farms it is sometimes inconvenient, if not impossible, to bring livestock to a central place for feeding. In these instances, it becomes necessary to transport the feed to the livestock. Often, the transporting involves moving single bales of hay. For this and other reasons, an uncomplicated and efficient device for transporting single hay bales would be a welcome addition to the equipment inventory of the farmer or rancher.

There are numerous transporting devices known in the art that are adapted to load and transport bales of hay. For example, U.S. Pat. Nos. 4,095,706 (Schwien et al.), 4,573,846 (Willbanks et al.), 4,773,806 (Beaulieu), 5,639,198 (Pearce), and 5,769,587 (Gilfoil et al.) show devices for transporting bales of hay. However, unlike the present invention, the instant devices utilize complicated hydraulic mechanisms for manipulating the bales.

U.S. Pat. Nos. 145,505 (Beidelman, Jr.), 1,122,805 (Schertz), 4,549,743 (Shimon), and 5,474,312 (Starita) et al. disclose hand carts that may be used for transporting single bales of hay. The aforementioned patents however, do not disclose an uncomplicated device for impaling and lifting the single bales.

U.S. Pat. No. 5,090,368 (Berghoefer) shows a device for carrying animals.

None of the above inventions and patents, taken either singly or in combination, is seen to disclose the instant invention as will be subsequently described and claimed.

SUMMARY OF THE INVENTION

The present invention is a cart adapted to pick up single bales of hay or straw for easy transport. The cart is fabricated from metal stock material attached, by welding or the like, to form a rigid frame including a handle, two wheels, and plural bale impaling prongs. Two fixed prongs are positioned at the front of the cart and a single swinging prong is suspended adjacent the handle.

The cart is designed with an unobstructed space formed between the wheels so that the cart may straddle a bale of hay or straw. Manipulation of the cart, as will be later explained, will allow a user to lift a bale of hay or straw for transport to a desired location.

In a second embodiment, a pair of removable wheels are provided for the top of the cart at the front end thereof. The addition of wheels will allow the cart to be utilized as a dolly, if desired. Also, the second embodiment employs a rack which may be removably positioned on the top of the cart. The rack is used to transport small implements such as rakes, shovels etc.

Accordingly, it is a principal object of the invention to provide a cart for transporting a bale of hay or straw.

It is another object of the invention to provide a cart which has structure to facilitate lifting a bale of hay or straw.

It is a further object of the invention to provide a cart for transporting a bale of hay or straw, which cart may be utilized as a dolly.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
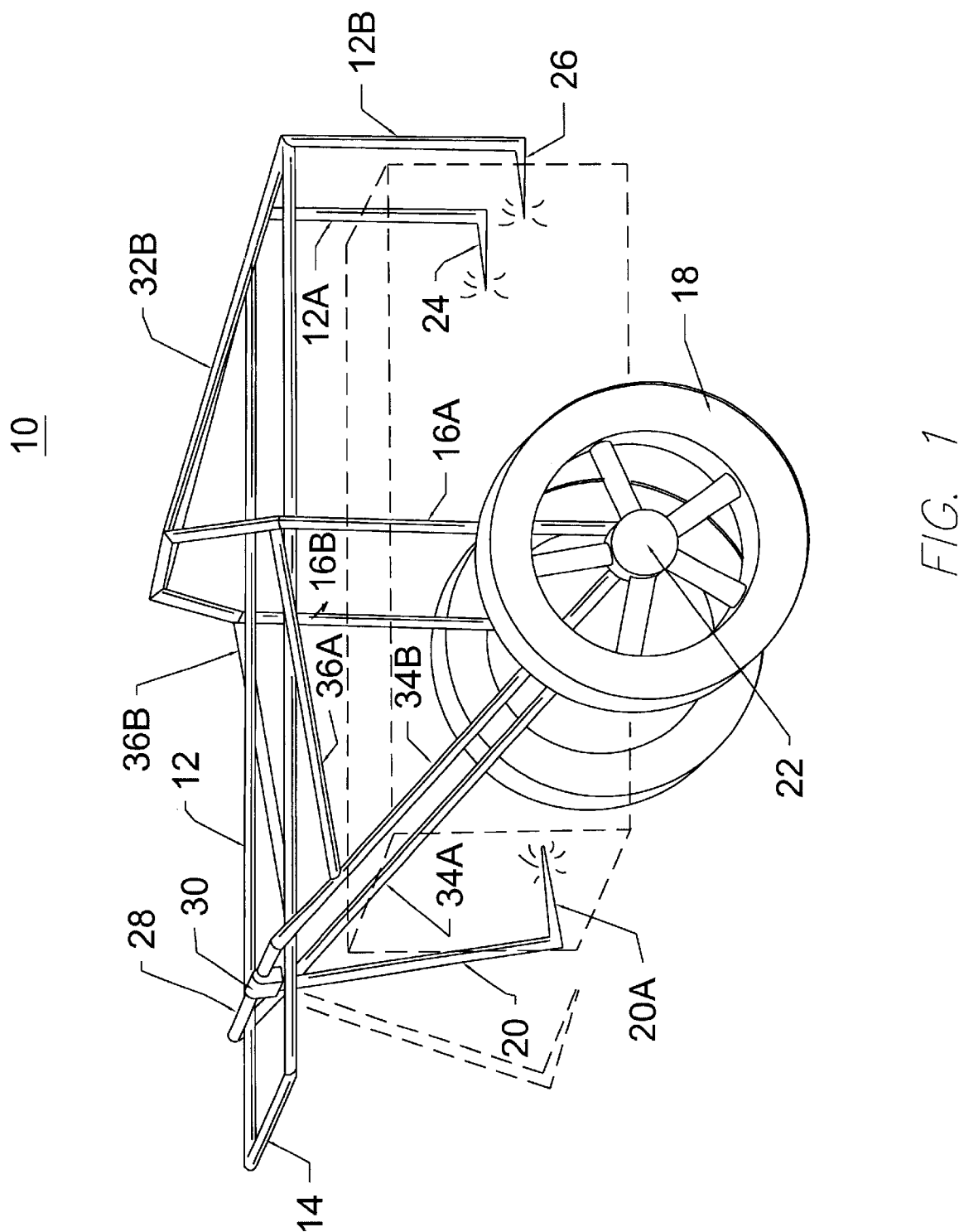
FIG. 1 is an environmental, perspective view of a first embodiment of a hay bale cart according to the present invention.
Figure 2:
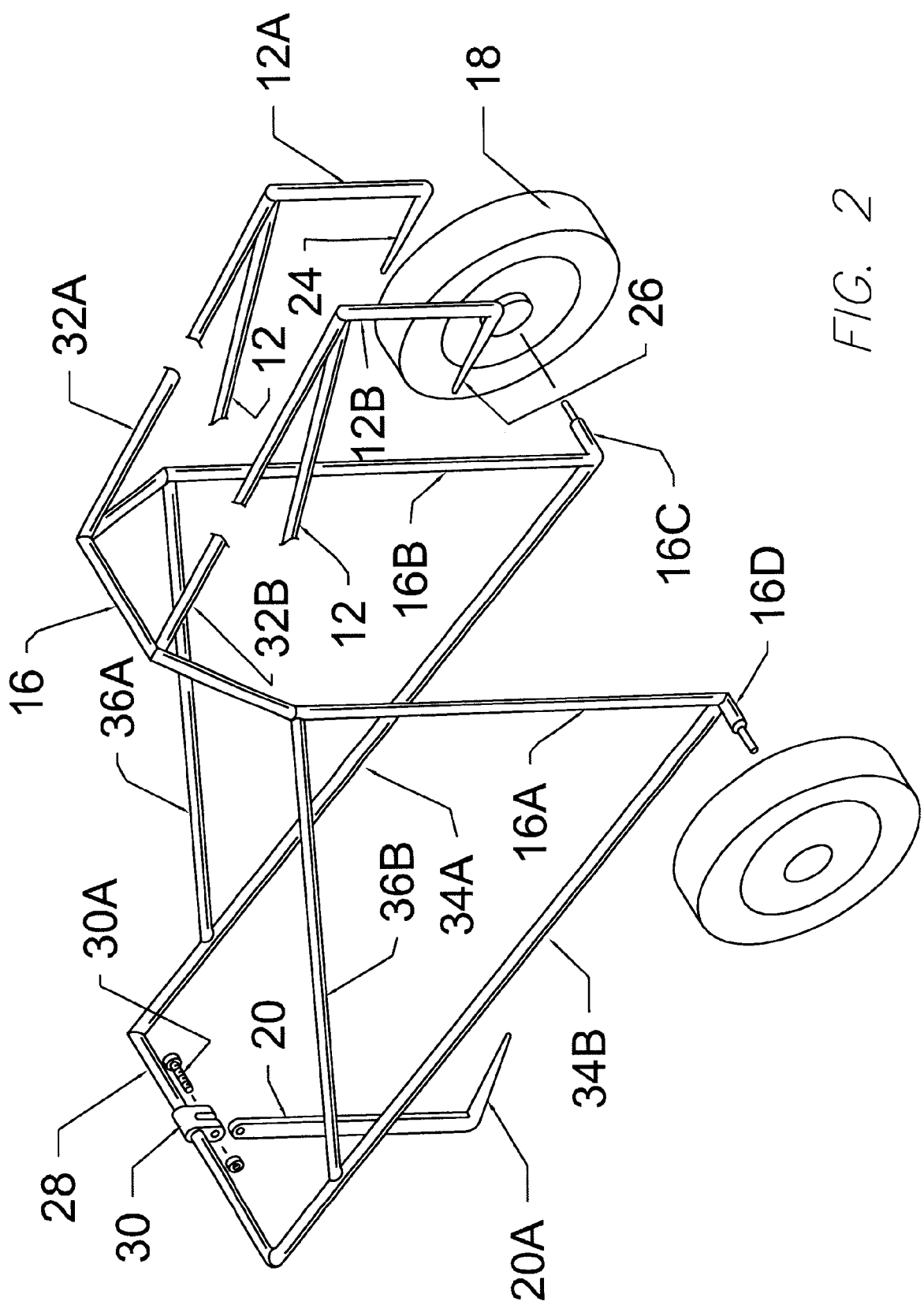
FIG. 2 is a fragmented, partially exploded view of the hay bale cart of FIG. 1 according to the present invention.

As illustrated in the embodiment of FIGS. 1 and 2, the cart of the present invention is generally designated at 10 and is fabricated of four main structural parts which comprise a U-shaped member 12 having a handle 14, a wheel mounting frame 16, wheels 18, and a swinging prong member 20.

As best shown in FIG. 1, member 12 extends from handle 14 to form spaced apart front legs 12a and 12b. Legs 12a and 12b extend a predetermined first distance perpendicularly downward from member 12. Prong members 24 and 26 are integrally formed with respective front legs 12a and 12b and extend perpendicularly therefrom in a direction toward handle 14. The space between prong members 24 and 26 is unobstructed. Prong members 24 and 26 resemble the tines of a fork, being adapted for piercing a bale of hay.

Wheel mounting frame 16, FIGS. 1 and 2, also generally shaped as a U, is firmly attached to member 12 at a predetermined distance from handle 14, by welding or the like, in such manner that the U shapes are perpendicular one to the other. Frame 16 is positioned such that the closed end of the U is above member 12 with legs 16a and 16b extending to positions beneath member 12. Legs 16a and 16b are turned outward to form axles 16c and 16d. Wheels 18 are rotatably mounted on axles 16c and 16d and are secured thereto by conventional means (cotter pins, locknuts, etc.) 22.

A cross brace 28 is rigidly attached to member 12 adjacent handle 14. Bracket 30 is fixed to cross brace 28 and is provided with holes to accommodate pivot pin 30a. A swinging prong support member 20 depends from cross brace 28 and is pivotally attached thereto via bracket 30 and pivot pin 30a. Prong support member 20 extends downward from cross brace 28 a distance approximately the same as the aforesaid first distance of legs 12a and 12b. An integral prong 20a is formed at the end of member 20. Prong 20a is oriented to face prongs 24 and 26.

Structural braces 32a and 32b are rigidly secured at respective front ends 12a and 12b. Braces 32a, 32b extend upwardly in spaced parallel fashion and are rigidly attached to the top of frame 16. Structural brace members 34a and 34b are rigidly secured at the ends of respective legs 16a and 16b. Braces 34a, 34b extend upwardly in spaced parallel fashion and are rigidly attached to member 12 and cross brace 28. Structural brace members 36a and 36b are rigidly secured to respective brace members 34a and 34b at a predetermined point along each length thereof. Braces 36a, 36b extend upwardly in spaced parallel fashion and are rigidly secured to member 12 and frame 16.

The dimensions of the above structural members may obviously be determined by one skilled in the art based on the projected size of the bale to be transported.

To lift a bale of straw or hay, the cart 10 is first centered to straddle the bale. Handle 14 is then tipped upwardly, moving fixed prongs 24, 26 adjacent to a front horizontal midline of the bale. The cart is then moved in a rearward direction which forces fixed prongs 24, 26 into the front of the bale. Next, handle 14 is tipped downward so that swinging prong 20a can be pushed into the rear end of the bale. The cart is now leveled, thereby hoisting the bale from the ground. The bale may then be transported to a desired point of use by pushing the cart.

Figure 3:
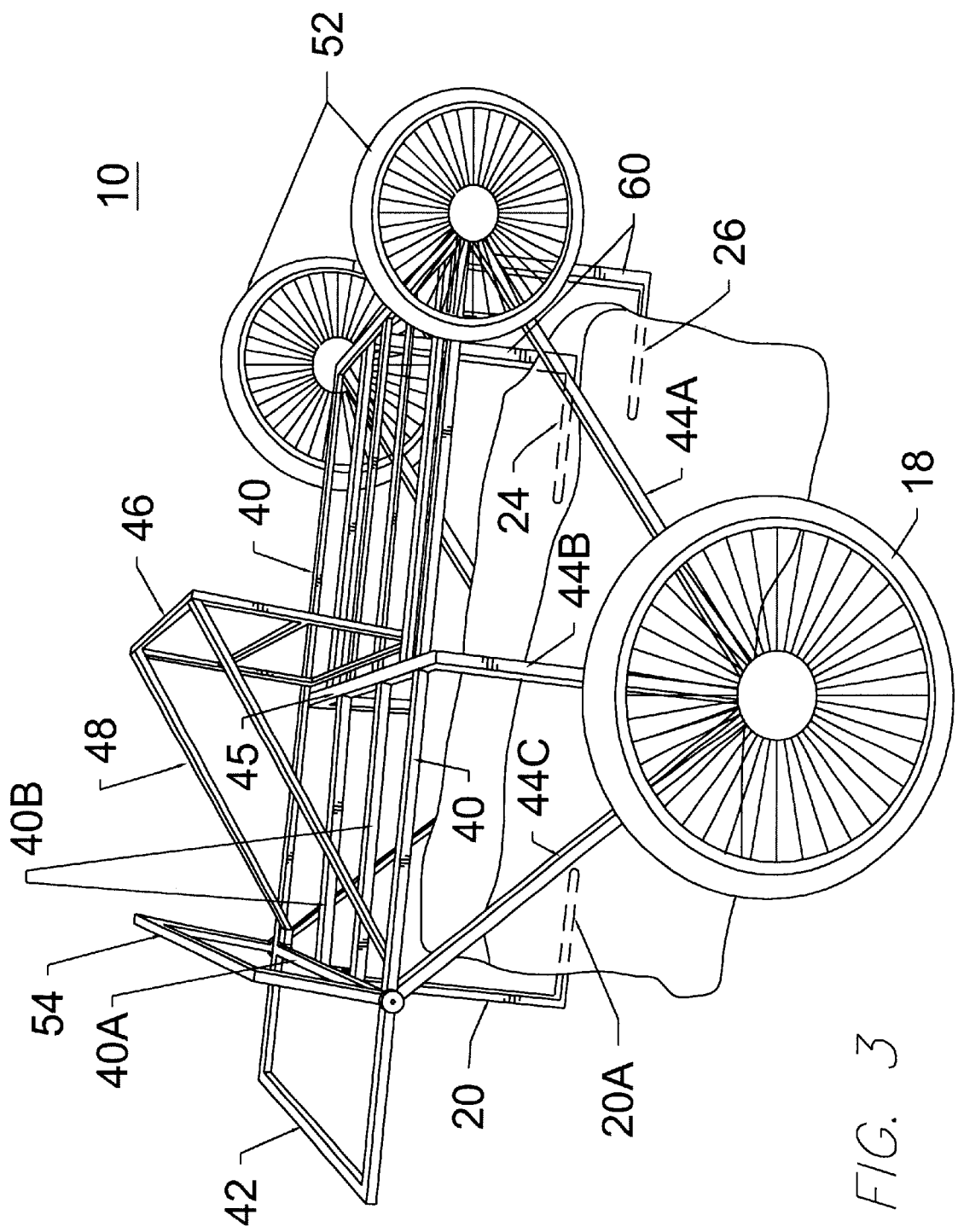
FIG. 3 is an environmental, perspective view of a second embodiment of a hay bale cart according to the present invention.
Figure 4:
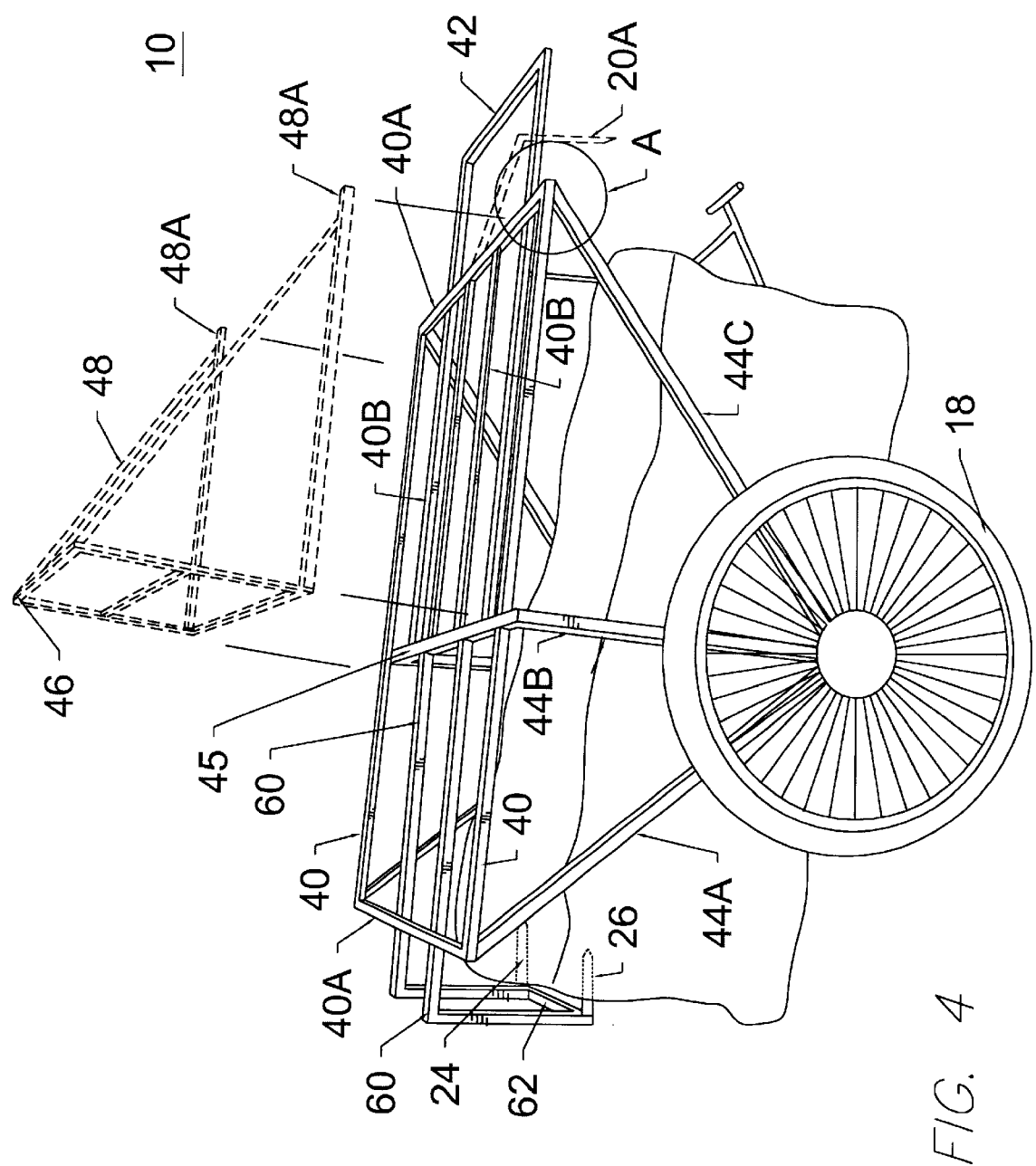
FIG. 4 is an environmental, perspective view of the basic cart structure of a second embodiment of a hay bale cart according to the present invention.
Figure 5:
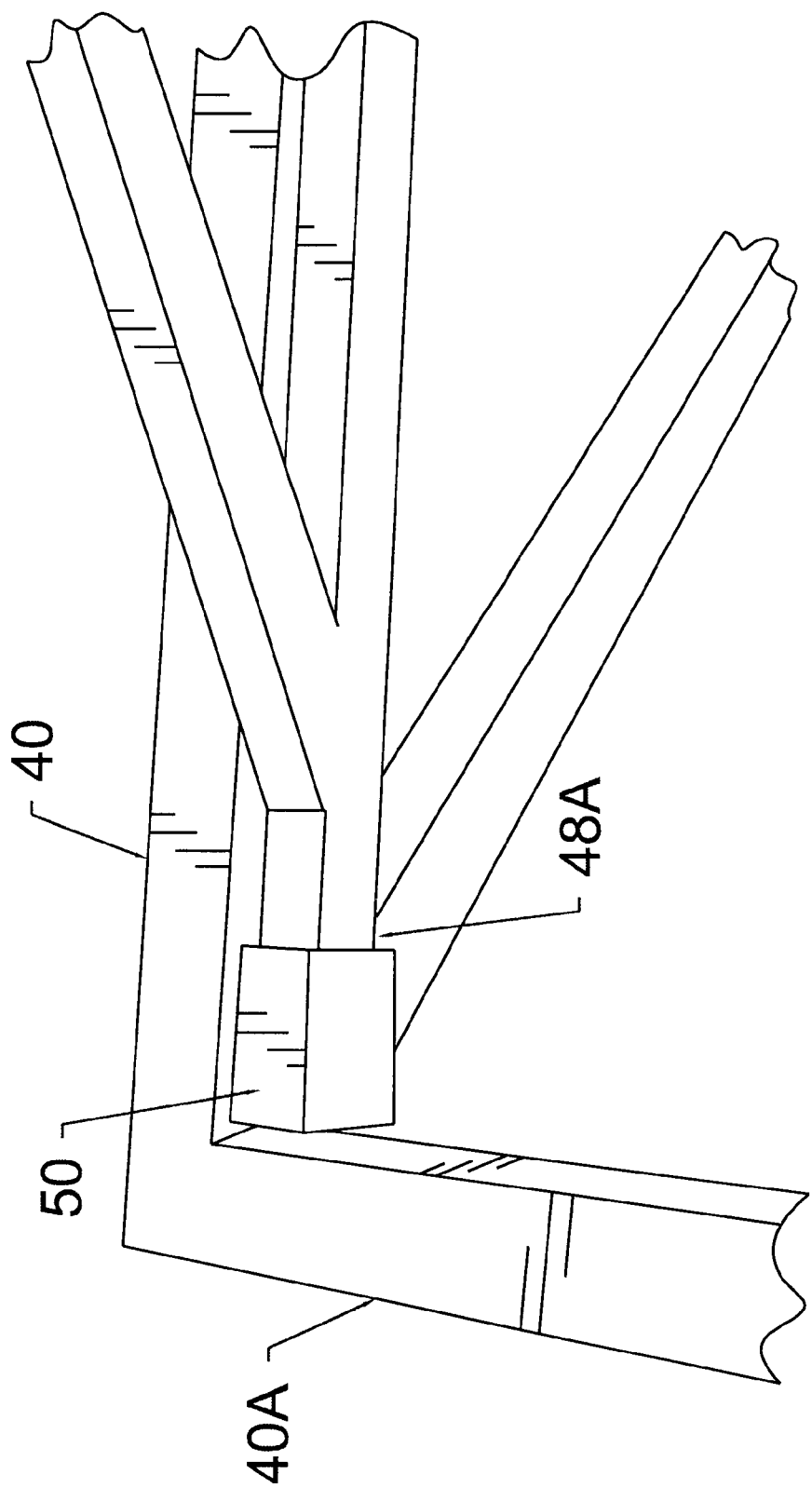
FIG. 5 is a partial view of FIG. 4 taken at A which shows a rack fitting pocket according to the present invention.

As illustrated in FIGS. 3–5, a second, and preferred, embodiment of the cart comprises a frame of rectangular configuration and formed by side rail members 40 and end beam members 40a. Integral with and depending from the side rail members are wheel supports 44a, 44b, and 44c. Wheel supports 44a and 44c slope downward from the ends of side rail member 40 to form a triangle, wheel 18 being rotatably mounted on an axle at the apex of the triangle, wheel support 44b depending from the midpoint of side rail 40 to the apex of the triangle. The triangular shapes formed by side rail members 40 and wheel supports 40a, 40b and 40c provide rigid side supports of great strength for the cart.

The frame includes a center support section, which includes a cross beam 45 extending parallel to end members 40a and bisecting side rail members 40. A pair of support legs 60 extend from the cross beam 45 parallel to side rails 40 to beyond front end beam 40a, and bend downward at a 90° angle, and support a pair of front prongs 24, 26, which extend back towards the cross beam 45 or center of the cart. The support legs 60 may be supported by attachment to the front end beam member 40a. The prongs 24, 26 may be supported independently, as shown in FIG. 3, or joined by a cross leg 62 as shown in FIG. 4. A pair of reinforcing intermediate rail members 40b extend between the cross beam 45 and the rear end member 40a, parallel to side rail members 40. U-shaped handle 42 extends to the rear of the frame from cross beam 45, and is supported by rear end member 40a. Swinging prong member 20 is attached to rear end member 40a in the same manner as the swing prong member 20 is attached to the cross brace 28 of the first embodiment, the prong 20a facing the front prongs 24, 26.

The frame may be constructed in any manner conventionally none in the art, as by welding the frame members together. In a preferred embodiment, the frame is constructed in three sections, including a pair of side sections each side section having a side rail member 40 made integral with wheel supports 44a, 44b, and 44c, and a center section, including at least cross beam 45, end members 40a, longitudinal rails 40b, support legs 60 and front prongs 24, 26. The center section may also include handle 42 and swinging prong member 20, or these components may be removably attached to the center section. The two side sections may be joined to the center section by bolts, and the pair of wheels 18 may be mounted on axles attached to wheel supports 44a, 44b and 44c. The manner of using the preferred, second embodiment of the cart to lift and transport a bale of hay is substantially the same as the manner of using the first embodiment.

A removable rack 46 is adapted to be positioned on the top side of the rectangular frame. Rack 46 has a rectangular front face configuration supported by two legs 48 sloping rearwardly, each leg 48 having a free end 48a best seen in FIG. 5, pockets 50 (only one shown) are positioned in an inner corner of the frame to receive a respective free end whereby the rack may be secured to the frame. Each pocket 50 is a hollow sleeve having an interior perimeter slightly smaller than the outside diameter of the free ends 48a so that the free ends 48a are slidable into the pockets 50. The rack 46 may be used to support rakes, shovels, and other small implements.

A pair of dolly wheels 52 (FIG. 3) are removably positioned on the front end of the frame above the front prongs 24, 26. Wheels 52 are smaller than wheels 18 and may be attached to the frame in any conventional and convenient manner. Dolly wheels 52 are used in conjunction with removable U-shaped stand 54, which is mounted perpendicular to the frame adjacent the rear end member 40a with the crossbar of the U extending from the top of the frame. The stand 54 may be attached to the frame by any conventional fastener, as by bolts, pins, etc. As mentioned above, the additional wheels will allow the cart to be flipped and function as a dolly when desired, the cart being supported by the small dolly wheels 52 and the stand 54.

It is to be understood that the present invention is not limited to the sole embodiment described above, but encompasses any and all embodiments within the scope of the following claims.

We claim:

1. A hand cart for transporting a bale, said hand cart comprising:

a frame member, said frame member having a front end, a rear end, a top side and an underside;

a handle defining said rear end;

a first means positioned at said front end for impaling and hoisting said bale;

a second means positioned between said handle and said front end for impaling and hoisting said bale;

a first pair of wheels, said first pair of wheels attached to said underside of said frame member and supporting said frame member; and a second pair of wheels removably attached to the top side of said frame member at said front end, whereby said frame member can be moved on said first pair of wheels to transport said bale.

2. The hand cart of claim 1, wherein said first means comprises a pair of prongs fixedly mounted at said front end.

3. The hand cart of claim 1, wherein said second means comprises a bracket attached to said frame member, a prong support, and at least one prong pivotally mounted to said bracket.

4. The hand cart of claim 1, wherein said second pair of wheels are smaller than said first pair of wheels.

5. The hand cart of claim 1, further comprising a U-shaped stand removably mounted to said frame member at said rear end of said frame member and extending from the top side of said frame member, whereby the cart can be flipped over and supported by said stand and said pair of wheels.

6. The hand cart of claim 1, wherein said frame member is fabricated from metal stock.

7. The hand cart of claim 1, further comprising: a rack, said rack having a pair of free ends; and a third means for removably supporting said rack on the top side of said frame member.

8. The hand cart of claim 7, wherein said third means comprises a pair of pockets disposed on said frame member, said pair of pockets slidably receiving said pair of free ends of said rack.

9. The hand cart of claim 8, wherein said rack has a front face of rectangular configuration and a pair of support legs sloping rearwardly defining a triangular configuration when viewed from a side of said frame member.

10. The hand cart of claim 7, wherein said rack is fabricated from metal stock.

11. The hand cart of claim 1, wherein said first means comprises at least one prong mounted on said front end.

* * * * *